E. L. THOMAS.
STEAM BAKER.
APPLICATION FILED JUNE 16, 1913.
1,156,723.
Patented Oct. 12, 1915.
2 SHEETS—SHEET 1.
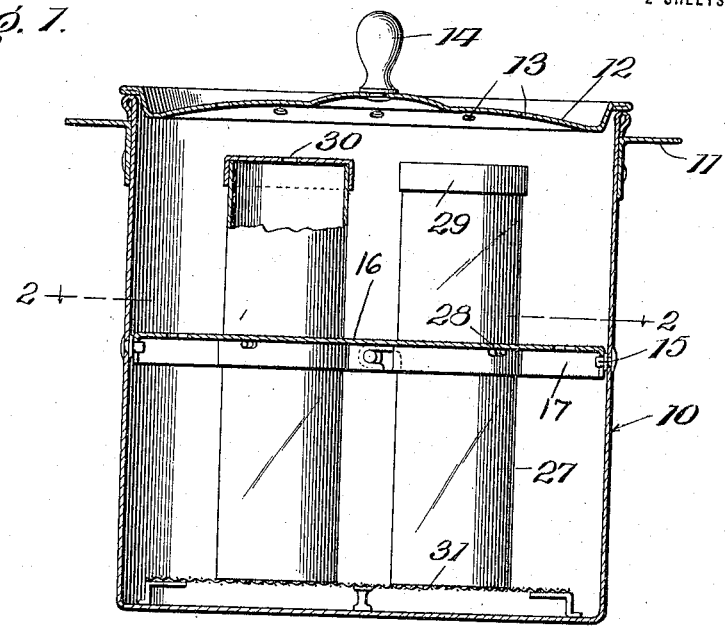
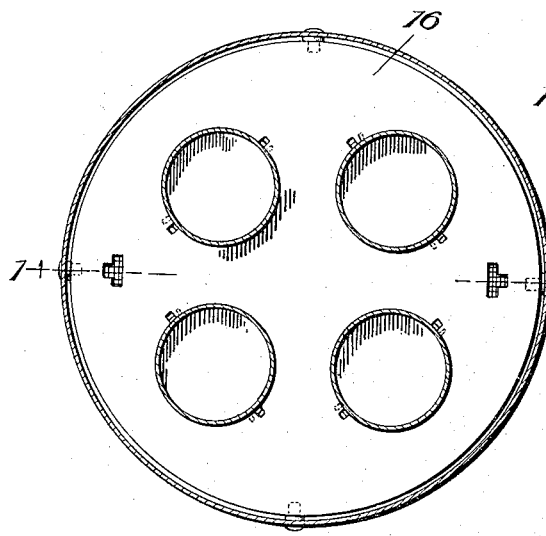
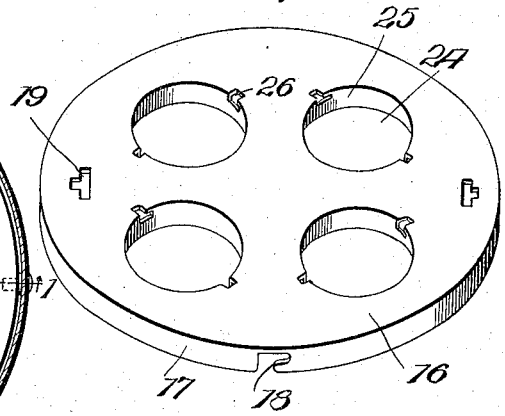
Witnesses
Inventor
E. L. Thomas.
By
Attorneys.

E. L. THOMAS.
STEAM BAKER.
APPLICATION FILED JUNE 16, 1913.

1,156,723.

Patented Oct. 12, 1915.
2 SHEETS—SHEET 2.

Witnesses

Inventor
E. L. Thomas.
By
Attorneys

UNITED STATES PATENT OFFICE.

ETTA L. THOMAS, OF CORNING, IOWA.

STEAM-BAKER.

1,156,723.   Specification of Letters Patent.   Patented Oct. 12, 1915.

Application filed June 16, 1913. Serial No. 774,000.

*To all whom it may concern:*

Be it known that I, ETTA L. THOMAS, citizen of the United States, residing at Corning, in the county of Adams and State of Iowa, have invented certain new and useful Improvements in Steam-Bakers, of which the following is a specification.

My invention relates to new and useful improvements in cooking utensils or vessels and more particularly to steam cookers and the object of my invention is to provide a steam cooker which is provided with a supporting plate which may be applied to or removed from the main body of the water holding receptacle and which will support an inner food holding receptacle above the water.

A further object of my invention is to provide means for locking the supporting plates in place in the outer receptacle and for locking the food holding receptacle to the supporting plate to prevent all movement of the food holding receptacle during the cooking operation because of the boiling of the water or the steam pressure within the vessel.

With these and other objects in view, my invention will be more fully described, illustrated in the accompanying drawings, and then specifically pointed out in the claim which is attached to and forms a part of this application.

Figure 4:
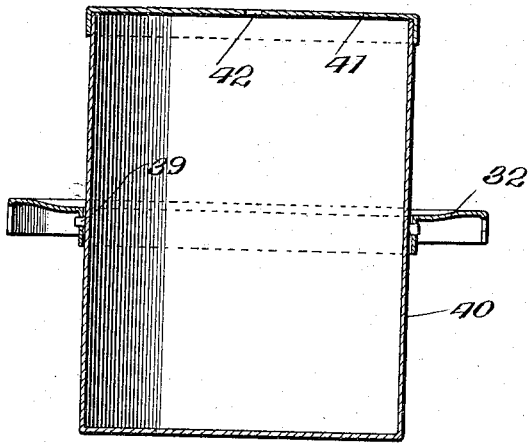
Figure 5:
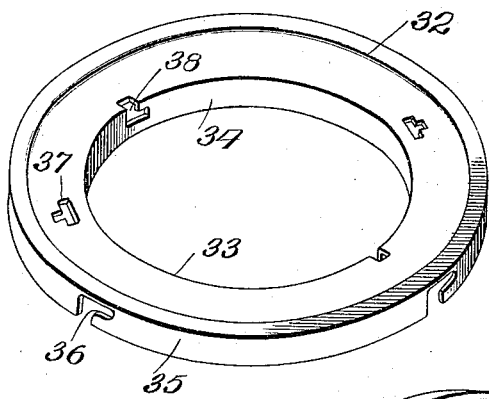
Figure 6:
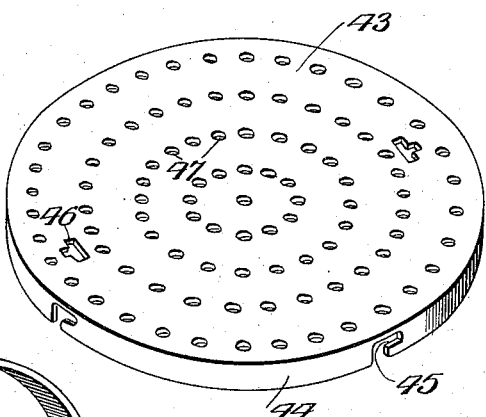
Figure 7:
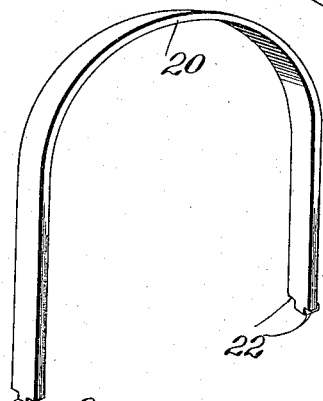

In the drawings: Figure 1 is a vertical central sectional view of my improved steam cooker, showing the manner of employing the same to cook a number of different food products at the same time; Fig. 2 is a horizontal sectional view taken on the line 2—2 of Fig. 1; Fig. 3 is a perspective view of the form of supporting plate employed with the food holding receptacle shown in Figs. 1 and 2; Fig. 4 is a central vertical sectional view taken through another form of food holding receptacle and through the supporting plate employed in supporting the same; Fig. 5 is a detached perspective view of the supporting plate shown in Fig. 4; Fig. 6 is a perspective view of a still further modified form of supporting plate; Fig. 7 is a perspective view of the handle employed in raising and lowering the supporting plates and food holding receptacles carried thereby.

Corresponding and like parts are referred to in the following description and indicated in all the views of the drawings by the same reference characters.

The preferred embodiment of my invention, as illustrated in the drawings, includes an outer or water holding receptacle 10 closed at its lower end and open at its upper end and provided with laterally directed ears 11 forming handles. This water holding receptacle may be formed of any suitable sheet metal, such a aluminum, granite or other enamel ware, as preferred. In use it is closed at its upper end by a removable lid or cover 12 provided with a plurality of openings 13 through which steam may escape and with a knob or handle 14. The wall of this receptacle 10 is provided intermediate its height and at equally spaced points with a plurality of inwardly directed studs 15 adapted to lockingly engage one or the other of a plurality of supporting plates or food receptacle supporting trays. The above described receptacle may be made in any size, shape and proportions desired, but will usually be cylindrical in shape and the trays above mentioned are shaped and proportioned to fit within the receptacle as shown in Fig. 2 of the drawings in which one of the trays is indicated by the numeral 16. This tray 16 is provided with a downwardly directed circumferential flange 17 and said flange is provided at spaced intervals with upwardly directed bayonet slots 18 adapted for locking engagement with the pins or studs 15. By this means the supporting plate or tray when lowered in place and partially rotated will be supported by the pins and also locked against upward movement until counter-rotated.

The body portion of the tray is provided at diametrically opposite points with T-shaped openings 19. A resilient U-shaped bail or handle 20 is provided with reduced terminals 21 forming shoulders 22 and having their free ends bent outwardly at right angles to the body portion as at 23 to form hooks. This handle may be employed in lowering the supporting plate or tray into the outer receptacle 10 or in removing the same, the terminals 23 being passed through the inner portions of the openings 19 and then springing outwardly to seat their terminals beneath the body portion of the tray. The tray may be turned by twisting the handle to seat the pins 15 in the bayonet slots of the tray and the handle may at any time be removed by springing its side portions toward each other to free its terminals from the openings of the tray.

The tray 16 is provided with a plurality of openings 24, preferably circular in shape and each provided with a downwardly depending encircling flange 25. The body of the tray 16 and the upper portions of these flanges 25 are cut-away to provide a pair of diametrically disposed bayonet slots 26 for each opening. A plurality of individual food holding receptacles 27 are proportioned to pass freely through the openings 24 of the tray and are provided intermediate their length with diametrically disposed laterally directed pins 28 adapted for locking engagement in the bayonet slots 26. Each of these food holding receptacles is provided with a detachable cover 29 preferably having a steam escape opening 30. The food holding receptacles are therefore supported by the supporting plate or tray which is in turn supported by the studs of the outer water holding receptacle. However, in practice I prefer to additionally support the food holding receptacles by means of a woven mesh mat or other suitable supporting device 31 resting upon the bottom of the water holding receptacle and partially relieving the tray of the weight of food contained in the cooker.

In employing the above described cooker, the various articles of food to be cooked are placed in the various food holding receptacles and the cover applied thereto. A suitable quantity of water is then placed in the outer or water holding receptacle and heated. In the meantime, the food holding receptacles are mounted in the supporting plate or tray 16 and the latter is lowered into place by means of the handle which is then removed. The cover 12 is then applied. With this cooker a number of different kinds of food may be steamed at the same time without having the flavor of one article mingle with that of another as the various kinds of food are contained in separate food containing receptacles. The handle may of course be readily applied when the food is cooked, to raise the tray, together with the food holding receptacles, from the cooker.

In Figs. 4 and 5 I have illustrated a modified form of tray, indicated by the numeral 32, this tray being identical with that shown in Fig. 3, except that instead of having a plurality of openings 24 each surrounded by a flange 25, it is formed with a single relatively large central opening 33 surrounded by a flange 34. The outer flange 35, corresponding to the flange 17 of the tray 16, is provided with bayonet slots 36 similar to the slots 18 and the body portion is provided with diametrically positioned openings 37 corresponding to the openings 19 and said body, together with the inner flange 34, is cut-away to provide bayonet slots 38 corresponding to the bayonet slots 26 and adapted to receive diametrically extending pins 39 carried by a food holding receptacle 40. This food holding receptacle is proportioned to fit in the opening 33 of the tray and is provided with a cover 41 having a vent opening 42 through which steam may escape. This form of tray and food holding receptacle may be employed when but one article of food is to be cooked at once, particularly if a large quantity of food is to be cooked.

In addition to the above described supporting plates or trays I provide yet another type such as shown in Fig. 6 of the drawings. This tray 43 is provided with a marginal, downwardly directed flange 44 having bayonet slots 45 and its body is provided with the handle receiving openings 46. This supporting plate or tray is not however, provided with openings to receive food holding receptacles as the food itself is placed either directly upon the tray or in separate cups or other containers which are seated upon the tray. For this reason, the tray is provided with a plurality of perforations 47 through which steam may pass to the upper portion of the cooker.

As the operation and employment of the cooker is the same with the trays 32 and 43 as with the tray 16, any further description is deemed unnecessary. It will of course be understood that I do not wish in any way to limit myself to the specific details of construction shown in the drawings, and described in the specification, as various minor changes, within the scope of the appended claim, may be made at any time without in the slightest degree departing from the spirit of my invention.

Having thus described the invention, what is claimed as new is:

In combination, a vessel having studs projecting inwardly from its wall, a tray removably fitted within the vessel and having a downwardly extending flange in which are formed downwardly opening bayonet slots to lockingly engage the inwardly projecting studs of the vessel, said tray having an opening and a flange surrounding such opening and depending therefrom, the depending flange and adjacent part of the tray having inwardly and upwardly opening bayonet slots partly formed therein and a second vessel removably supported in the opening of the tray and having outwardly extending studs to enter the said bayonet slots, formed in the tray and depending flange, to lockingly engage the bayonet slots and hold the second vessel against vertical movement.

In testimony whereof I affix my signature in presence of two witnesses.

ETTA L. THOMAS. [L. S.]

Witnesses:
B. NEWCOMB,
W. W. RUNYON.

Copies of this patent may be obtained for five cents each, by addressing the "Commissioner of Patents, Washington, D. C."